United States Patent [19]
Ruihley et al.

[11] 4,133,245
[45] Jan. 9, 1979

[54] FASTENING DEVICE

[75] Inventors: Robert E. Ruihley, Bryan; Frank E. Perkins, Kunkle; Robert W. Arps, Defiance; Walter P. Troder, Bryan, all of Ohio

[73] Assignee: Allied Moulded Products, Inc., Bryan, Ohio

[21] Appl. No.: 751,182

[22] Filed: Dec. 16, 1976

[51] Int. Cl.$^2$ ............................................. F16B 13/08
[52] U.S. Cl. ............................................. 85/80; 85/85
[58] Field of Search ............... 85/80, 85, 84, 36, 5 R; 403/408; 151/41.75; 24/73 SM, 73 MF

[56] References Cited
U.S. PATENT DOCUMENTS

| | | | |
|---|---|---|---|
| 2,244,976 | 6/1941 | Tinnerman | 85/80 |
| 2,260,147 | 10/1941 | Lundberg et al. | 85/36 |
| 2,344,423 | 3/1944 | Simmons | 85/36 |
| 3,212,391 | 10/1965 | Duffy | 85/36 |
| 3,217,584 | 11/1965 | Amesbury | 85/80 |
| 3,226,145 | 12/1965 | Goldberg | 85/80 |
| 3,375,749 | 4/1968 | Coldren et al. | 85/80 |
| 3,826,024 | 7/1974 | Petersen | 85/8.3 X |
| 3,895,732 | 7/1975 | Robinson et al. | 85/85 X |

*Primary Examiner*—Ramon S. Britts

[57] ABSTRACT

A fastening device for use with conventional threaded, knurled, serrated, or smooth cylindrical studs comprising a cylindrical bore, the bore having a counter sink at one end thereof and a counter bore at the other end thereof, and a tubular fastener formed of relatively thin spring steel positioned within the bore. The fastener is slotted from end to end to be resiliently compressible, and thereby useable within bores of different diameters. At one end, the fastener has a rigid collar larger than the member which fits within the counter sink of the bore. The fastener adjacent the other end has a plurality of fingers, which are positioned in the counter bore. The fingers are folded so as to extend radially outwardly of the member at a position remote from the distal ends thereof to form an enlarged portion which substantially fills the counter bore, and are folded adjacent the distal ends so as to position the distal ends radially inwardly of the fastener. The fingers adjacent the distal ends have camming surfaces thereon which cooperate with the countersink to facilitate the insertion of the fastener within the bore and wedging surfaces remote from the distal ends which cooperate with the counterbore and the aforementioned collar and countersink to prevent the removal of the fastener from the bore. The distal ends of each of the fingers engage the stud positioned within the fastener. The stud can be positioned within the fastener by forcing the stud in an axial direction from the countersink to the counterbore. The stud so positioned within the fastener cannot be removed from the fastening device by forces in the opposite axial direction without damage to the stud, the fastener, or the bore.

21 Claims, 9 Drawing Figures

FASTENING DEVICE

BACKGROUND OF THE INVENTION

1. Field of the Invention

The invention relates to a fastening device and more particularly to a female fastening device for use with a stud and to a female fastening device of the "quick-connect" type.

2. Description of the Prior Art

The prior art is replete with fastening devices for use with studs. Some of these fastening devices are of the "quick-connect" type, and thus, have some of the same advantages as does the fastening device of the invention in reducing both the time and labor associated with the assembly of devices using conventional fastening devices.

However, some of the prior art fastening devices and especially the "quick-connect" type devices require non-conventional studs or non-conventional mountings to accommodate the fastener. It is therefore, highly desirable to provide a fastener, especially of the "quick-connect" type, for use with conventional studs, such as threaded, knurled, serrated, and smooth cylindrical studs. It is also highly desirable to provide such a fastener which can be used in a conventional bore so as to allow manufacturers to machine bores for the fasteners using conventional machinery or to use molds of simple configurations.

Other prior art fastening devices lack the strength required for particular uses. It is therefore highly desirable to provide a fastening device of the type above-described having a holding strength comparable with the strength of the material with which the fastening device is to be used. It is also highly desirable to provide a fastening device which has a holding strength comparable to conventional threaded fasteners.

Still other prior art fastening devices are complex in structure and not easily manufactured. It is therefore highly desirable that such a device be easily manufactured at a low cost.

SUMMARY OF THE INVENTION

It is therefore the primary object of this invention to provide an improved fastening device.

It is another object of this invention to provide an improved fastening device for use with conventional studs such as threaded, knurled, serrated, and smooth cylindrical studs.

It is another object of this invention to provide an improved fastening device of the "quick-connect" type for use with conventional studs such as threaded, knurled, serrated, or smooth cylindrical studs.

It is another object of this invention to provide an improved fastening device in which a threaded stud may be threadedly inserted and threadedly removed, and also be inserted by axially thrusting the threaded stud into the device.

Another object of this invention is to provide an improved fastening device comprising a fastener positioned in a bore for use with conventional studs, such as threaded, knurled, serrated, notched or smooth cylindrical studs, which has sufficient strength, to prevent the stud from being pulled from the device and the fastener from being pulled from the bore.

It is another object to provide an improved fastening device which can be relatively inexpensively made on conventional machinery.

It is another object of this invention to provide an improved fastener for use with conventional studs, such as threaded, knurled, serrated, or smooth cylindrical studs, in a cylindrical bore which is appreciably not larger in diameter than bores conventionally used with the same size stud.

In the broader aspects of this invention there is provided an improved fastener for use with conventional studs, such as threaded, knurled, serrated, or smooth cylindrical studs and a cylindrical bore. Together, the fastener and the bore comprise an improved fastening device. The bore has enlarged bore portions at the opposite ends thereof. The fastener comprises a tubular member fitted within the bore, the tubular member having opposite enlarged ends fitted within the enlarged bore ends. The enlarged member ends being rigid in the direction of the bore so as to prevent the tubular member from being removed from the bore. The tubular member also having means for frictionally engaging the stud positioned within the member, the means being resiliently flexible in one axial direction and being rigid in the opposite axial direction whereby a stud is insertable into the fastening device of the invention by pushing the stud into the tubular member in one axial direction of the fastening device of the invention but not removable from the fastening device of the invention by pulling the stud in the opposite axial direction.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings wherein.

DESCRIPTION OF A SPECIFIC EMBODIMENT

Figure 1:
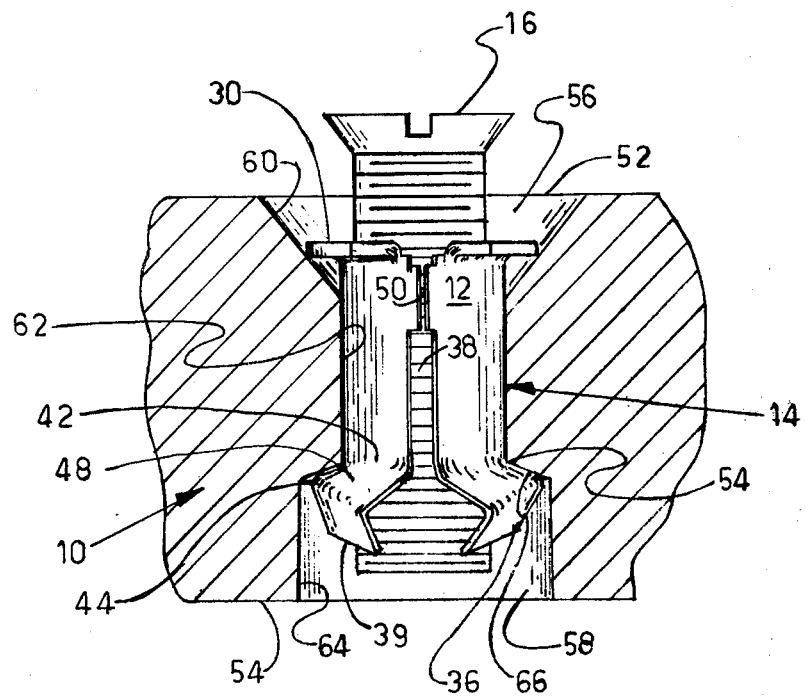
FIG. 1 is a cross-section view of the fastening device of the invention showing the fastener of the invention positioned in the bore of the device and a threaded stud positioned within the fastening device.
Figure 2:
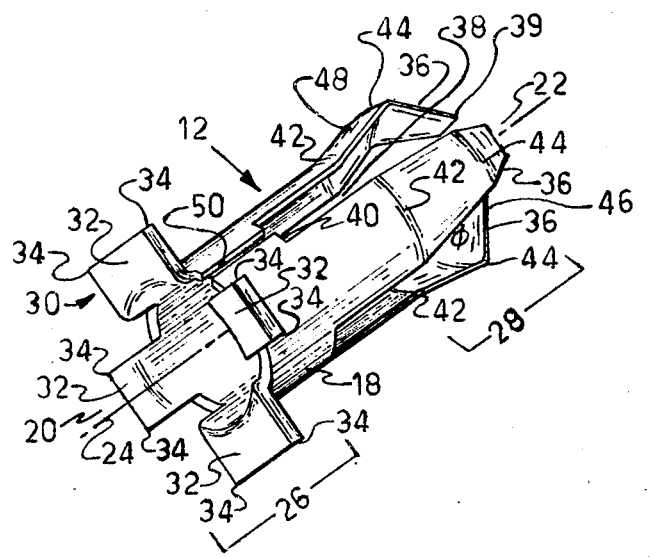
FIG. 2 is a perspective view of the fastener of the invention, showing the tubular lip adjacent one end thereof and the slot configuration defining the gripping fingers adjacent the other end thereof.

Referring to the drawings, and more particularly to FIGS. 1 and 2 there is shown the improved fastening device 10 of the invention. FIG. 2 illustrates the fastener 12 of the fastening device 10 which is positioned in the bore 14 and used with a threaded stud 16. FIG. 1 illustrates the fastening device 10, i.e. the combination of the fastener 12 and the bore 14, with a threaded stud 16 positioned within the fastener 12.

The fastener 12 of the preferred embodiment is made of relatively thin spring steel punched and formed into the configuration illustrated in FIG. 2. The fastener 12 comprises tubular member 18 which has opposite ends 20 and 22. Tubular member 18 has a longitudinal axis 24 about which most of the structure of the fastener 12 is circumferentially spaced. Adjacent the opposite ends 20, 22, tubular member 18, respectively, has enlarged portions 26 and 28.

Enlarged portion 26 comprises a lip 30 defined by circumferentially spaced apart tabs 32. While in the specific embodiment shown, four tabs 32 shown arranged 90° from each other, more of less tabs 32 can be used if desired. Each of the tabs 32 extend radially outwardly of the tubular member 18 and generally perpendicularly to the axis 24. Each of the tabs 32 are substantially rigid both in axial direction and in a direction transverse to the axis 24. Also, each of the tabs 32 have oppositely disposed sharp corners 34 on opposite sides of the distal ends thereof. This structure, in part, prevent the fastener from rotating in the bore 14, or being pushed into the bore by the insertion of stud 16 into the fastener, as will be explained hereinafter.

Enlarged portion 28 adjacent end 22 of the tubular member 18 is formed from a plurality of gripping fingers 36 which are defined by longitudinally extending slots 38 in tubular member 18. Slots 38 extend from end 22 to slot ends 40, which in the specific embodiment illustrated are positioned adjacent to but spaced from end 20. Each finger 36 is thus elongated and extends axially of the tubular member 18 for substantial part of the entire length of tubular member 18. Fingers 36 are generally rectangular in shape, but are tapered, as will be described hereinafter.

Each of the fingers 36 have a distal end 39 which engage the stud 16. Distal ends 39 also have a specific shape which will be described hereinafter.

While three fingers 36 and three slots 38 are shown spaced circumferentially about axis 24 at 120° intervals in the specific embodiment illustrated, more or less fingers 36 can be utilized provided that the fingers 36 possess sufficient strength and have sufficient stud contact for the purpose for which the fastening device of the invention is utilized. The specific embodiment illustrated having three fingers 36 is a compromise between the properties of the material from which the fastener 12 is made, the ease of insertion of a stud into the fastener 12, and the strength of the fastener 12.

Enlarged portion 28 is formed by folding each of the fingers 36 radially outwardly of the tubular member 18 at fold line 42 and folding the fingers 36 radially inwardly of the tubular member 18 at fold line 44 so as to position the distal ends 39 of the fingers 36 radially inwardly of the tubular portion 18. Fold lines 42 are remote from the distal ends 39 whereas fold lines 44 are adjacent to but spaced from distal ends 39. Fold lines 44 are intermediate fold line 42 and distal ends 39 and define a crest which represents the largest diameter dimension of enlarged portion 28.

Fold lines 42, 44 and distal ends 38 also define camming surfaces 46 and wedging surfaces 48 on each of the fingers 36. Camming surfaces 46 extend between distal ends 38 and fold lines 44 and cooperate with the bore 14, as will be mentioned hereinafter, to facilitate the positioning of the fastener 12 within the bore 14. Wedging surfaces 48 extend between fold lines 42 and fold lines 44 and cooperate with the bore 14 and with collar 30, in a manner which will be described hereinafter, to prevent the fastener 12 from being removed from the bore 14, after installation.

The tubular member 18 also has a slot 50 therein which extends between the opposite ends 20 and 22 of the tubular member 18. Slot 50 in the specific embodiment illustrated extends from end 20 and communicates with one of the slots 38 at slot end 40. In both cases, slot 50 allows tubular member 18 to be radially compressible and therefore adaptable for use in bores 14 of different diameters.

Figure 4:
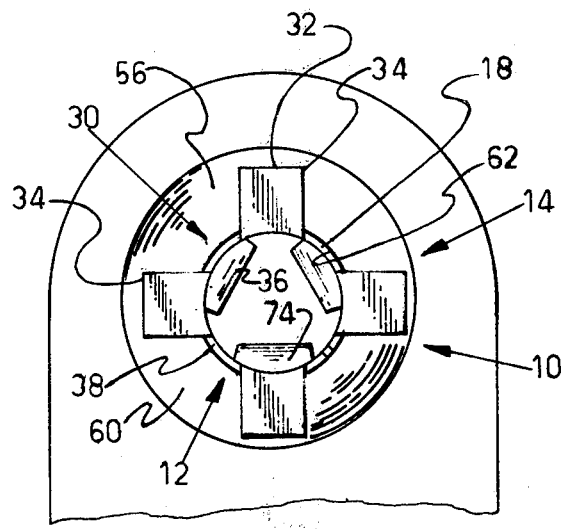
FIG. 4 is a top plan view of the fastening device of the invention.
Figure 5:
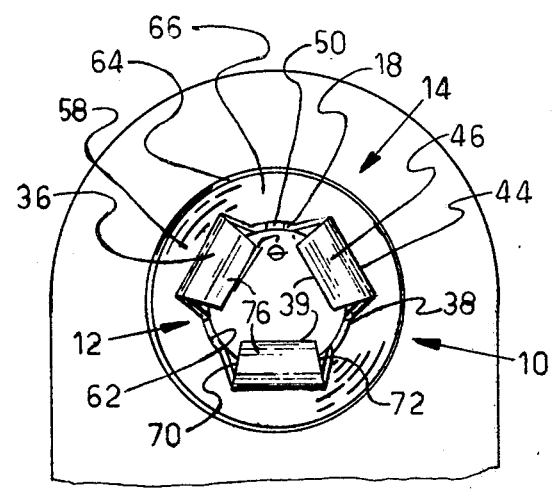
FIG. 5 is a bottom view of the fastening device of the invention.

Now referring to bore 14 as shown in FIGS. 1, 4 and 5, the specific shape of bore 14 and the cooperation between the structure of bore 14 and the structure of fastener 12 will be described in detail. Bore 14 as aforementioned is cylindrical in shape. Bore 14 has opposite ends 52 and 54. Adjacent end 52, bore 14 has an enlarged bore portion 56, and adjacent end 54, bore 14 has an enlarged bore portion 58. Enlarged bore portion 56 is shaped to define a conical surface 60 which extends from end 52 to the interior cylindrical bore surface 62. Enlarged bore portion 56, in the specific embodiment illustrated, is a conventional countersink.

Enlarged bore portion 58 is defined by a cylindrical wall 64 which is appreciably larger in diameter than the cylindrical wall 62 of bore 14 and which is coaxially positioned with respect to cylindrical wall 62. The bottom 66 of enlarged portion 58 defines a conical surface extending between the cylindrical walls 64, 62, respectively. In a specific embodiment, enlarged portion 58 can be a conventional counterbore, the bottom 66 being formed by the tapered drill bit. Thus, it can be seen that the bore 14 can be formed on a conventional drilling machine using conventional drill bits and countersinks. Also, it will be recognized by those persons skilled in the art that bore 14 can also be molded using dies of the simplest construction.

The fastener 12 is positioned within the bore 14 as illustrated in FIG. 1. By positioning the fingers 36 within the countersink 56 with the camming surfaces 46 in engagement with the conical surface 60 thereof, the fastener 12 can be positioned within the bore 14 by merely exerting pressure upon the fastener 12 in an axial direction toward end 54. By exerting such pressure, the camming surfaces 46 in cooperation with the conical surface 60 will resiliently compress the fingers 36 and the tubular member 18 into a diameter a size smaller than the cylindrical wall portion 62 of the bore 14 without bending tabs 32, upwardly. Once the fingers 36 are pushed through the bore portion defined by cylindrical wall 62, the fingers 36 adjacent the distal ends 39 will be positioned within enlarged bore portion 58 and will resiliently expand to substantially fill bore portion 58. Because of the longitudinal slot 50 in tubular member 18, the fastener 12 as above mentioned can be positioned within bores of different sizes. Thus, the need for close tolerances are completely eliminated.

With the fastener 12 positioned in the bore 14 as illustrated in FIG. 1, the wedging surfaces 48 of the fingers 36 are engaged with the bottom 66 and the wall 64 of the enlarged bore portion 58. Further, the corners 34 of the tabs 32 are in engagement with the conical surface 60 of the enlarged bore portion 56. By these engagements, the fastener 12 is prevented from rotation within the bore 14 being removed from the bore 14, once positioned. Tabs 32 being substantially rigid prevent the fastener 12 from being removed from the bore 14 by a force exerted on the fastener 12 in an axial direction toward end 54 smaller in magnitude than the force necessary to bend all of the tabs 32 upwardly and into a position in which they form a mere continuation of the centrally located tubular portion of the member 18. Similarly, the wedging surfaces 48 are in engagement with bottom 66 and wall 64 and prevent the fastener 12 from being removed from the bore 14 by axial forces exerted on the fastener 12 in the opposite direction which are smaller than that necessary to totally deform the fingers 36. Folds 44 of fingers 36 also engage the interior surface 64 of enlarged bore portion 58 at different vertical positions thereof. The resistance to any vertical axial force being increased by the staggered positioning of folds 44 as opposed to folds 44 of fingers 36 being of similar vertical position on interior surface 64.

Figure 6A:
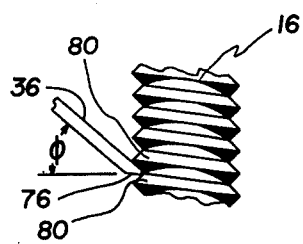
FIGS. 6A, 6B, 6C and 6D are respectively fragmentary side views of a portion of a threaded, a knurled stud, or serrated stud, and a smooth cylindrical stud positioned within the fastener of the invention as illustrated in FIG. 2 showing the detail of the distal ends of the gripping fingers in engagement with the stud.
Figure 6B:
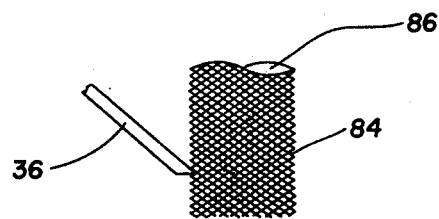
Figure 6C:
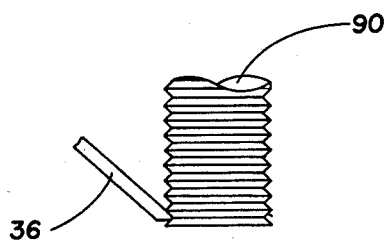
Figure 6D:
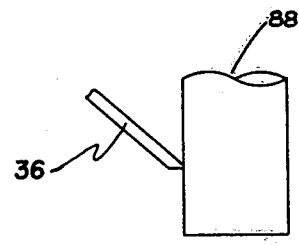

Once a threaded stud 16, or other notched studs such as the knurled stud as shown in FIG. 6B or a serrated stud as shown in FIG. 6C, or a smooth cylindrical stud as shown in FIG. 6D is positioned within the fastener 12 as illustrated in FIG. 1, the forces necessary to deform the fingers 36 are substantially greater than those forces necessary to deform the tabs 32 inasmuch as the distal ends 39 of the fingers 36 are in engagement with the stud whereby a force in the opposite axial direction will cause the fingers 36 to jam between the bottom 66 and/or wall 64 of the enlarged bore portion 58 and the stud, as will be mentioned again hereinafter.

As above-mentioned, each of the fingers 36 are generally rectangular in shape but tapered. Each of the fingers are tapered in two or three ways. First, the longitudinally extending sides 70 and 72 are tapered between the distal ends 39 and the fold line 42. The transverse finger dimension at fold line 42 is in the case of each finger 36 larger than the transverse dimension of finger 36 at the distal end 39.

Figure 3:
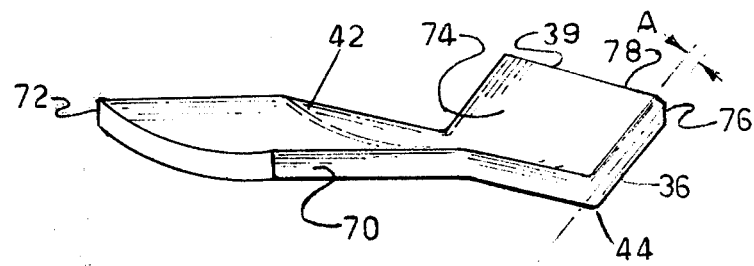
FIG. 3 is a perspective view of the detail of the distal end of one of the fingers of the fastening device illustrated in FIG. 1.

Also, each of the fingers 36 is tapered between the distal end 39 and the outside surface 74 of the finger 36 so as to form a planar surface 76 extending between the distal end 39 and the surface 74 as shown in FIG. 3. Thus, the distal end surface 78 has a length equal to the width of the finger 36 at distal end 39 but a width A substantially smaller than the thickness of the finger 36 at the distal end 39. This tapering of the distal end 39 permits the distal end 39 to be positioned between adjacent thread turns 80 of the stud 16 shown in FIG. 6A; between adjacent ridges of the knurled stud shown in FIG. 6B or between adjacent serrations of the serrated stud shown in FIG. 6C.

Additionally, in the case of threaded stud 16, each of the distal ends 39 is angularly disposed to a plane perpendicular to the axis 24. This angle best shown in FIG. 5 and given the reference numeral $\theta$ positions the trailing edge of each of the fingers 36 with reference to a clockwise motion of the stud 16 positioned within the fastener 12 deeper into the space between adjacent thread turns 80 than the leading edge thereof and facilitates the ease of inserting the threaded stud 16 into the fastener 12 by clockwise rotation thereof.

The distal ends 38 of each of the fingers 36 are also positioned at different distances from end 20 of tubular member 18. This is achieved by varying the vertical dimension of each finger 36 between the fold lines 42 and 44. This different dimensioning of the fingers 36 positions the distal ends of each of the fingers between different thread turns 80 of the threaded stud 16, between different serrations 88 of the serrated stud 90, between different ridges 84 of the knurled stud 86, and at different vertical positions on cylindrical stud 82. The angle $\phi$ defined by the camming surfaces 46 and a plane perpendicular to axis 24 being constant for each finger 36.

The specific embodiment illustrated made from 0.017 to 0.019 inch thick zinc plated tempered spring steel and having the following dimensions of the fastener 12 and bore 14 have proven satisfactory and represents the best mode of the invention for use with a No. 6 threaded stud, in inches.

| | |
|---|---|
| Outside radius of tubular member 18 | .093 |
| Width of tab 32 | .075 |
| Width of slot 50 | .000 to .010 |
| Width of finger 36 adjacent distal end 38 | .080 |
| Width of finger 36 remote from distal end 38 | .125 |
| Diameter of collar 30 | .291 |
| Width of slot 38 | .035 |
| Distance between slot end 40 and end 20 | .094 |
| Diameter of enlarged portion 28 at fold line 44 | .230 |
| Distance between distal end 39 and fold line 42 of fingers 36: | |
| shortest finger | .115 |
| mediate finger | .126 |
| longest finger | .136 |
| Angle $\theta$ | 4° 50' |
| Angle $\phi$ | 40° |
| The vertical distance between folds 42 and 44 of fingers 46: | |
| shortest finger | .063 |
| mediate finger | .074 |
| longest finger | .084 |
| Width of distal end 39 | .005 |
| Axial length of bore 14 | .403 |
| Depth of counterbore | .125 |
| Depth of countersink | .108 |
| Diameter of bore 14 at end 52 | .300 |
| Diameter of bore 14 at end 54 | .280 |
| Axial length of bore 14 between the bottom of countersink 56 and counterbore 58 | .170 |

In operation, the improved fastening device of the invention may be used to hold two parts together by means of a stud, such as a conventional bolt. Fastener 12 is positioned within the bore 14 in one part as above described. The threaded stud 16 is passed through an aperture in the other part (not shown) the aperture being smaller than the head of the screw or bolt and the threaded stud thereof is positioned within the fastener 12. The fingers 36 of the fastener 12 provide for easy entry by the threaded stud 16 by either positioning threaded stud coaxially of the fastener 12 adjacent end 20 and thrusting the threaded stud into the fastener 12 in an axial direction. Each of the fingers 36 are resiliently moved by the threaded stud radially outwardly with a pawl-like action until the threaded stud is positioned as desired. Since each of the fingers 36 engage a different threaded turn of the threaded stud, insertion by this method is facilitated. After the threaded stud is so positioned, the threaded stud may be tightened as desired by clockwise rotation and loosened as desired by counterclockwise rotation.

Alternatively, the threaded stud may be positioned coaxially of the fastener 12 until the tip thereof engages the fingers 36 and the threaded stud may be positioned therein as desired by clockwise rotation. The lead angle $\theta$ of the fingers 36 in combination with the staggered orientation of the fingers 36 allow the threaded shaft to be threadedly inserted into the fastener 12 by clockwise rotation in a manner similar to the insertion of a threaded stud into a threaded bore as in conventional.

Once the threaded stud is so positioned in the fastener 12, a great amount of force is required to remove the threaded stud from the fastener 12. This is due to the jamming action of the fingers between the stud 16 and the interior surfaces 64, 66 of the enlarged bore portion 58 as above-described.

A knurled stud 86, or a serrated stud 90, or a smooth cylindrical stud 88 operates in much the same manner as above described. As will be apparent, once the stud 86 or the stud 90 or the stud 88 is positioned within the fastener 12, the fingers 36 will engage respectively different ridges of the stud 86, different serrations of the stud 90, and dig into different portions of the stud 88. The material of the stud 88 must be soft enough such that the fingers 36 will dig into the stud to provide the required holding strength. Only the threaded stud 16 may be tightened by clockwise rotation and loosened by counterclockwise rotation as above described. Once the knurled stud 86 or the notched stud 90 or the smooth cylindrical stud 88 is positioned within the fastener 12 by thrusting the stud into the fastener in an axial direction, no tightening or loosening can be achieved.

In normal applications, the fastener 12 cannot be displaced from the bore 14 by forces in the opposite axial direction inasmuch as the part being secured to the part containing bore 14 rests upon the surface in which is positioned bore end 52 and the aperture in the part through which the stud passes is smaller than the head of the stud or its equivalent. Thus, such forces in the opposite axial direction are born by the stud and the attached part, not the fastener 12 of the invention. Therefore, tabs 32 need only be sufficiently strong enough to resist the forces placed upon the fastener 12 when the stud is positioned therein by axially thrusting the stud to deform the fingers 36 as above mentioned.

The fastening device of the invention meets all of the objects above-stated. The fastening device of the invention is exceedingly strong and can be used in a conventionally shaped bore which can be formed by conventional machinery or molded using dies of the simplest nature. Furthermore the fastener 12 can be formed relatively inexpensively on conventional machinery, for example, the fastener 12 can be stamped from sheet spring steel and formed in a conventional punch press, such as a four slide or multi-slide punch press. Further, the fastening device of the invention can be used in all applications where a conventionally threaded opening can be used inasmuch as the bore 14 of the fastening device of the invention is only slightly larger than that required when using a conventional threaded bore. Lastly, the fastening device 10 of the invention has particular utility in plastic objects where the use of threaded bores do not possess the desired strength. By use of the fastening device of the invention additional strength can be achieved and in most applications, the only limitation on the strength that can be achieved is the strength of the material in which the bore 14 is formed.

The work "notched" is used herein to generally refer to the "threaded" stud 16 as shown in FIG. 6A, the "knurled" stud 86 as shown in FIG. 6B, the "serrated" stud 90 as shown in FIG. 6C and equivalents thereof.

While there have been described above the principles of this invention in connection with specific apparatus, it is to be clearly understood that this description is made only by way of example and not as a limitation to the scope of the invention.

What is claimed is:

1. A fastener comprising a tubular member having opposite ends, enlarged means adjacent said member ends, respectively, for cooperating with a bore in which said tubular member is positioned to prevent said member from being dislodged from said bore by forces applied to said member axially of said member and bore, flexible means for engaging a stud, said flexible means being resiliently flexible in one axial direction and rigid in the opposite axial direction, whereby said stud is insertable into said member by pushing said stud in said one axial direction, one of said enlarged member means being substantially rigid in at least one of said axial directions, the other of said enlarged member means including wedging surfaces, said bore having an enlarged end portion in which said other enlarged member means is positioned, said enlarged bore end portion including side walls and a bottom, said wedging surfaces and side walls and bottom engaging each other to jam said other enlarged member means between said bore and said stud upon moving said stud relative to said bore in said opposite axial direction.

2. The fastener of claim 1 wherein said other enlarged member means includes said flexible means, said other enlarged member means being radially inwardly flexible to a size smaller than said tubular member to facilitate the positioning of said member in said bore.

3. The fastener of claim 2 wherein said other enlarged member means has camming surfaces thereon for urging said other enlarged member means radially inwardly upon the insertion of said member into said bore, said other enlarged member means resiliently expanding into said enlarged bore end portion, thereby securing said member in said bore.

4. The fastener of claim 1 wherein the engagement of said wedging surfaces and sidewalls are at different axially and circumferentially spaced apart positions.

5. The fastener of claim 1 wherein said member from end to end is radially inwardly resiliently compressible, whereby said device of one size is useable with several different bore sizes.

6. The fastener of claim 1 wherein said flexible means includes a plurality of circumferentially spaced fingers.

7. The fastener of claim 6 wherein said stud is a threaded stud, said fingers being positioned to engage different threads of said stud, whereby said threaded stud is also insertable into said fastener by clockwise rotation of said threaded stud relative to said member and removable only by counter-clockwise rotation of said stud relative to said member.

8. The fastener of claim 7 wherein said stud is a smooth cylindrical stud, said fingers being positioned to engage different sideportions of said cylindrical stud, said fingers digging into said stud, whereby said cylindrical stud is irremovable from said fastener without damaging said stud, said fastener or said bore.

9. The fastener of claim 7 wherein said stud is a notched stud, said fingers being positioned to engage different ridges or notches of said stud, whereby said stud is irremovable from said fastener without destroying said stud, said fastener or said bore.

10. The fastener of claim 7 wherein each of said fingers are generally rectangular in shape, said fingers having opposite ends, one of said ends being a distal end, said distal ends being disposed angularly with respect to the longitudinal sides of said fingers.

11. The fastener of claim 10 wherein said distal ends are tapered longitudinally of said fingers between the longitudinal sides of said finger.

12. The fastener of claim 11 wherein said distal ends are tapered transversely of said fingers, said leading edges being longer than said trailing edges.

13. The fastener of claim 7 wherein each of said fingers is folded transversely thereof intermediate said finger ends, said fold defining two finger portions and an angle with said axis which is less than 180° and greater than 90°.

14. The fastener of claim 13 wherein said finger portions most remote from said tubular portion have said camming surfaces thereon, said other finger portions have said wedging surfaces thereon, both said camming and wedging surfaces being outwardly facing surfaces.

15. The fastener of claim 6 wherein said other enlarged member means includes said flexible means, said one enlarged member means being radially inwardly flexible to a size smaller than said tubular member to facilitate the positioning of said member in said bore, each of said fingers are generally rectangular in shape, said fingers having opposite ends, one of said ends being a distal end, said distal ends being slightly smaller than said other ends and disposed angularly with respect to the longitudinal sides of said finger, said distal ends being tapered, said other enlarged one member means, and said one of said enlarged bore end portions having camming surfaces thereon for urging said member means radially inwardly upon the insertion of said member into said bore, said other enlarged member means resiliently expanding into said other enlarged bore end portion, thereby securing said member in said bore, said member from end to end being radially inwardly resiliently compressible whereby said device of one size is useable with several different bore sizes.

16. The fastener of claim 15 wherein said distal ends are tapered longitudinally of said fingers between the longitudinal sides of said finger, said distal ends are tapered transversely of said fingers, said leading edges being longer than said trailing edges, each of said fingers is folded transversely thereof intermediate said finger ends, said fold defining two finger portions and an angle with said axis which is less than 180° and greater than 90°, said finger portions most remote from said tubular portion have said camming surfaces thereon, said other finger portions have said wedging surfaces thereon, both said camming and wedging surfaces being outwardly facing surfaces.

17. The fastener of claim 1 wherein said bore also has a second enlarged bore portion in which said one enlarged member means is positioned, said one enlarged member means resiliently expands into and engages the surface of said second bore end portion, whereby the expansion and engagement of said one enlarged means with said second enlarged bore end portion prevents the axial rotation of said member.

18. A fastening device comprising a member having a tubular bore therein, said bore having an axis and opposite ends, said bore having an enlarged bore portion at one of said opposite bore ends, a tubular fastener having opposite ends, said fastener being positioned in said bore, said fastener having opposite enlarged means adjacent said fastener ends for cooperating with said bore to prevent said fastener from being dislodged from said bore by forces applied to said fastener axially of said fastener and bore, one of said enlarged fastener means being substantially rigid in at least one axial direction, the other of said enlarged fastener means being positioned in said enlarged bore portion, and means for engaging a stud positioned in said fastener, said engaging means being resiliently flexible in said one axial direction and rigid in said opposite axial direction, whereby said stud is insertable into said member by pushing said stud in one axial direction, said other enlarged member means including wedging surfaces, said enlarged bore end portion including side walls and a bottom, said wedging surfaces and side walls and bottom engaging each other to jam said one enlarged member means between said bore and said stud upon moving said stud relative to said bore in said opposite axial direction.

19. The fastening device of claim 18 wherein said other enlarged fastener means includes said flexible means, said other enlarged fastener means being radially inwardly flexible to a size smaller than said tubular fastener to facilitate the positioning of said fastener in said bore, said other enlarged fastener means and said enlarged bore end portion having camming surfaces thereon for urging said other fastener means radially inwardly upon the insertion of said fastener into said bore, said other enlarged fastener means resiliently expanding into said enlarged bore end portion, thereby securing said fastener in said bore.

20. The fastening device of claim 18 wherein said flexible means includes a plurality of circumferentially spaced fingers each of which are positioned to engage said stud at different positions thereon, each of said fingers are generally rectangular in shape, said fingers having opposite ends, one of said ends being a distal end, said distal ends being slightly smaller than said other ends and disposed angularly with respect to the longitudinal sides of said fingers, said distal ends being tapered, said distal ends are tapered longitudinally of said fingers between the longitudinal sides of said finger, said distal ends are tapered transversely of said fingers, said leading edges being longer than said trailing edges, each of said fingers is folded transversely thereof intermediate said finger ends, said fold defining two finger portions and an angle with said axis which is less than 180°and greater than 90°.

21. The fastener of claim 18 wherein said bore also has a second enlarged bore portion in which said one enlarged fastener means is positioned, said one enlarged fastener means resiliently expands into and engages the surface of said second enlarged bore end portion, whereby the expansion and engagement of said one enlarged means with said second enlarged bore end portion prevents the axial rotation of said fastener.

* * * * *